United States Patent [19]

Stroud

[11] 4,356,418
[45] Oct. 26, 1982

[54] ALTERNATOR COIL WINDING

[76] Inventor: Lebern W. Stroud, 3237 Gerome, Fort Worth, Tex. 76118

[21] Appl. No.: 153,425

[22] Filed: May 27, 1980

[51] Int. Cl.³ .............................................. H02K 3/00
[52] U.S. Cl. ................................... 310/184; 310/198
[58] Field of Search ............... 310/263, 180, 184, 259, 310/166, 198–208, 254, 258; 219/133; 322/87

[56] References Cited

U.S. PATENT DOCUMENTS

| | | | |
|---|---|---|---|
| 2,473,257 | 6/1949 | Potter | 310/180 |
| 2,610,312 | 9/1952 | Seay | 310/198 |
| 3,321,653 | 5/1967 | Sonoyama | 310/180 |
| 4,161,683 | 7/1979 | Stroudt et al. | 310/198 |

Primary Examiner—R. Skudy
Attorney, Agent, or Firm—Arthur F. Zobal

[57] ABSTRACT

A unique coil winding configuration for a three phase winding connected in a Y configuration for the stator of an alternator for providing a high output at low engine rpm. Each phase of the winding comprises 14 coils which are located in the slots of a 42 slot stator with 5 turns in each slot.

5 Claims, 4 Drawing Figures

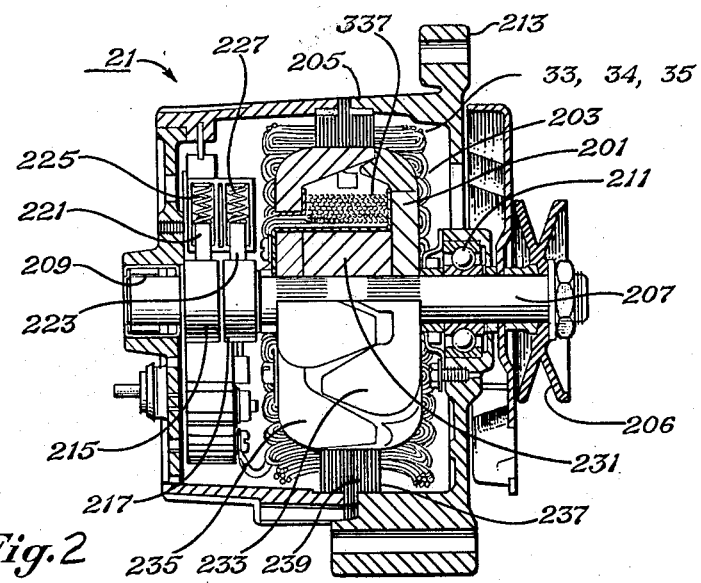
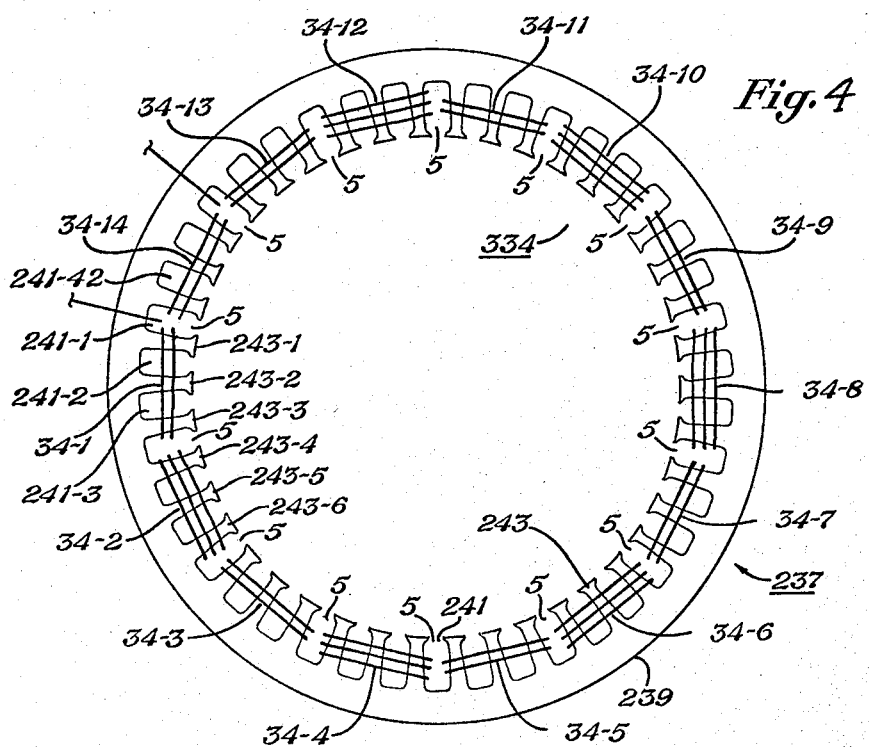

4,356,418

ALTERNATOR COIL WINDING

DESCRIPTION OF THE PRIOR ART

U.S. Pat. No. 4,161,683 discloses an alternator having a stator comprising an annular stator core having 42 segments with adjacent segments separated by a slot such that there are 42 slots. A three phase stator winding is provided, with each winding comprising 14 coils, each coil encircling three segments. The coils of the windings are wound such that when the windings are fitted in place in the stator, each slot has six wires passing through it.

U.S. patent application Ser. Nos. 33,443 and 51,910 disclose other types of alternator coil winding.

The alternator coil winding of U.S. patent application Ser. No. 33,443 was developed specifically for emergency vehicles such as ambulances. The alternator works satisfactory at engine idle of about 900 rpm. In many cases in the actual operation of the ambulances, the high temperature caused the engines to diesel. To avoid this situation, the mechanics would adjust the engine idle to a much lower rpm. Problems occurred in that the alternator could not carry the load at the lower engine idle.

SUMMARY OF THE INVENTION

It is an object of the present invention to provide an alternator coil winding that will supply the voltage and current required by a vehicle such as an ambulance at low engine idle.

The alternator is of the type having an annular stationary stator with a rotor concentrically located therein. The alternator comprises an annular structure formed of ferro-magnetic material defining an annular stator core having 42 segments with adjacent segments being separated by a slot such that there are 42 slots which extend in a direction parallel to the axis of said stator core. A three phase stator winding is connected in a Y configuration. Each phase comprises a winding having 14 coils and extending around said stator core on the inside thereof. Each of said coils of each phase comprises a plurality of turns of wire encircling three segments of the core. The 14 coils of each phase has a plurality of turns located in 14 of the slots such that said 14 slots of each phase respectively has the following number of turns 5, 5, 5, 5, 5, 5, 5, 5, 5, 5, 5, 5, 5, 5. The 14 coils of each phase respectively have the following number of turns at one edge 2, 2, 3, 2, 3, 2, 3, 2, 3, 2, 3, 2, 3, 2. In addition, the 14 coils of each phase respectively has the following number of turns at the other edge 2, 3, 2, 3, 2, 3, 2, 3, 2, 3, 2, 3, 2, 3.

In a further aspect, each of the windings are formed of 13 A.W.G. electrically conductive wire.

BRIEF DESCRIPTION OF THE DRAWINGS

FIG. 2 is a cross section of an alternator.

FIG. 4 is a plan view of the stator core of an alternator with the coil winding of FIG. 3 installed around its segments.

DESCRIPTION OF THE PREFERRED EMBODIMENT

Figure 1:
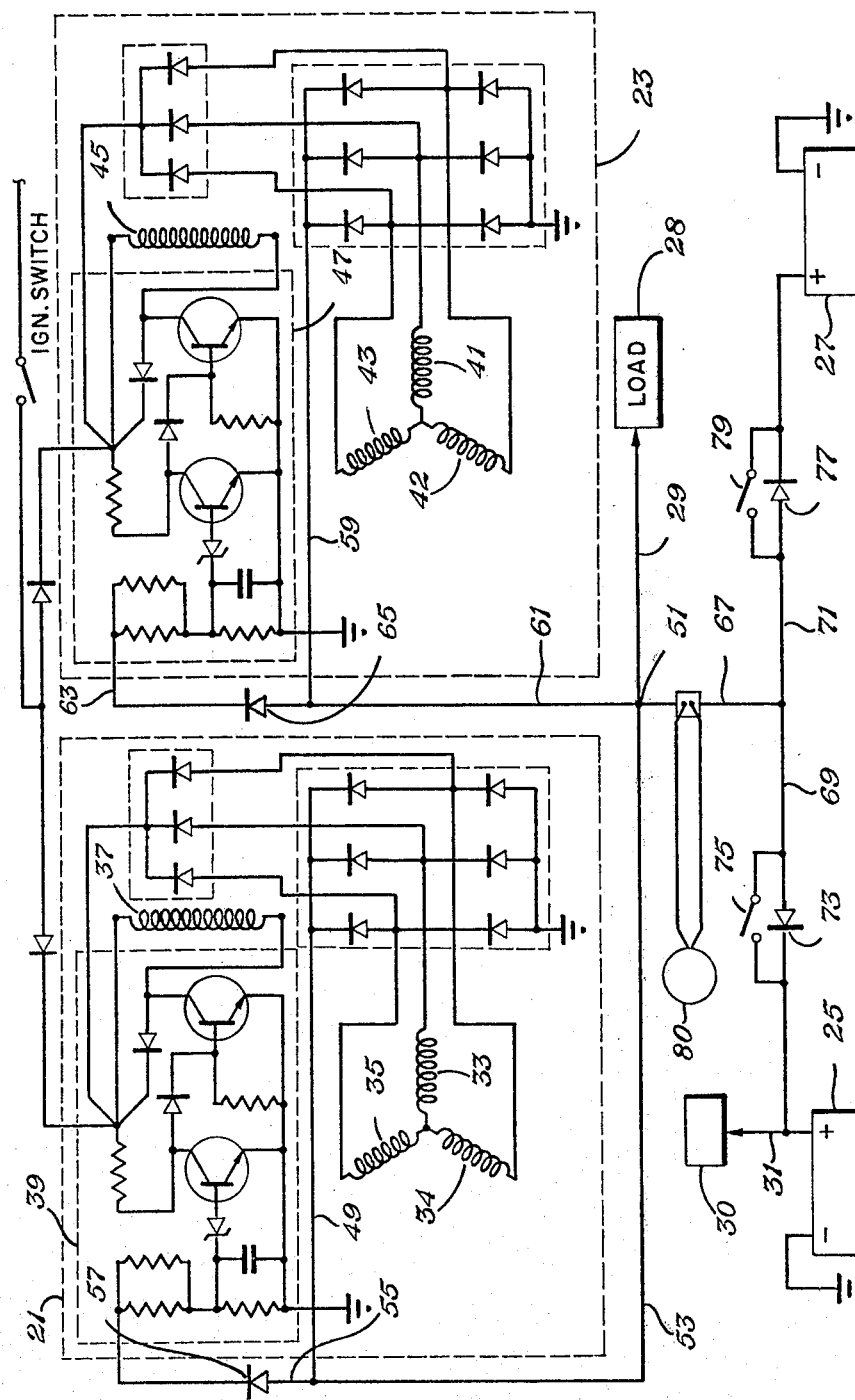
FIG. 1 is an electrical schematic diagram of dual alternators employed for charging two batteries and for supplying power to a load.

Referring to FIG. 1, reference numerals 21 and 23 identify two alternators employed for charging two batteries 25 and 27 and for supplying power to emergency equipment load 28 by way of lead 29. One of the batteries (battery 25) supplies power to the vehicle chassis electrical system 30 by way of lead 31. In the preferred embodiment, the motor vehicle is an ambulance and the emergency equipment load comprises emergency equipment carried by the ambulance such as a heart machine, breathing equipment, vacuum pumps, power outlets, etc. The vehicle chassis electrical system comprises the lights, radio, heating and cooling system, starting circuit, ignition circuit, etc.

The batteries 25 and 27 each are twelve volt batteries. Each alternator comprises a 3-phase Y winding for its stator core. In alternator 21, the three windings of the stator connected in a Y configuration are identified at 33, 34 and 35. The rotor coil is identified at 37. The regulator is shown in the dotted block 39. In alternator 23, the three windings of the stator connected in a Y configuration are identified at 41, 42 and 43. The rotor coil is identified at 45. The regulator is shown in the dotted block 47. The rotors of the alternators are turned by the engine of the vehicle.

The output lead 49 of alternator 21 is coupled to juncture 51 by way of lead 53 and to the input to the regulator 39 by way of lead 55 which includes a diode 57. The output lead 59 of alternator 23 is coupled to juncture 51 by way of lead 61 and to the input to the regulator 47 by way of lead 63 which includes a diode 65. Juncture 51 is coupled to both batteries 25 and 27 by way of lead 67 and leads 69 and 71. Diode 73 is coupled to lead 69 and a normally open switch 75 is coupled to lead 69 across the diode. Diode 77 is coupled to lead 71 and a normally open switch 79 is coupled to lead 71 across the diode. Member 80 is an ampmeter coupled to lead 67. With the switches 75 and 79 open, diodes 73 and 77 isolate the batteries from each other. If the starting battery 25 is down, power can be drawn from the other battery by closing the switches 75 and 79. Switches 75 and 79 also may be closed to provide backup from the two batteries to the alternators for supplying power to the load 28 in the event that one or both of the alternators go down. With switches 75 and 79 open, the alternators will be in a regenerative feedback condition. In this respect, the voltage drop across diodes 57 and 65 cause the alternators 21 and 23 to produce a higher output voltage at juncture 51 and thus cause the alternators to be in a regenerative feedback condition. The higher output at juncture 51 insures that there will be enough voltage at the batteries 25 and 27 to maintain the batteries charged.

Figure 3:
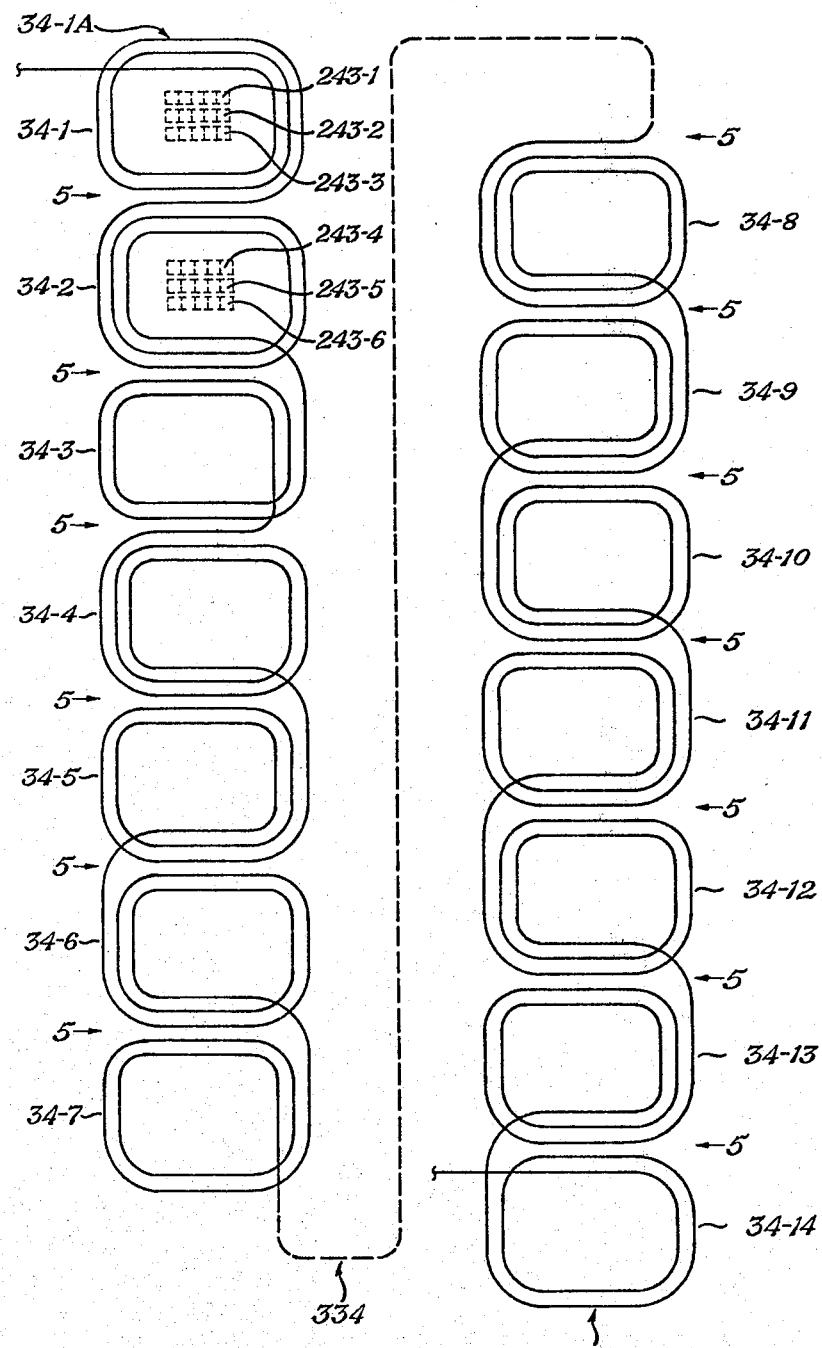
FIG. 3 illustrates the coil winding configuration of one phase of the alternator of the present invention.

Referring now to FIGS. 2–3, there will be described one of the alternators with its unique coil winding configuration which is of the type used for the dual alternators of the system of FIG. 1. In FIG. 2, the alternator shown is indicated to be alternator 21. Alternator 23 will be constructed in the same manner as alternator 21. As shown in FIG. 2, the alternator 21 comprises a rotor 201 and a stator 203, the latter of which is fixedly carried by a housing or case 205. Rotor 201 is rotatably carried by the case by a shaft 207 which is journaled by roller bearings 209 and ball bearings 211 to the case 205. Brackets 213 formed to the case 205 are adapted to receive bolts for coupling the alternator to mounting means adjacent the engine of the vehicle. A pulley 206 is mounted to the shaft 207 for receiving the belt from the engine for rotating the rotor 201.

Shaft 207 has two slip rings 215 and 217 mounted rigidly to it and insulated from each other and from the shaft. Slip rings 215, 217 are connected by conductors (not shown) to the coil 37 of rotor 201. Carbon brushes 221 and 223 are biased by springs 225 and 227 into sliding contact with the slip rings 215 and 217. Slip rings 215, 217 and brushes 221, 223 provide a connection for applying a D.C. exciting voltage to the rotor 201. A diode rectifier bridge (see FIG. 1) is attached to the inner side of the case 205 and is connected by conductors to the windings 33–35 of the stator 203 for converting the A.C. output to D.C.

Rotor 201 comprises a ferro-magnetic core 231 which is wound with conductive wire defining the rotor coil 37. The opposite sides of the core 231 have end portions which form north and south poles 233 and 235. The poles are formed into seven north poles and seven south poles which extend inward and mesh, but do not touch, with a corresponding pole of the opposite polarity.

Stator 203 comprises an annular core 237 formed of a plurality of stacked ferro-magnetic plates 239. A plan view of the core 237 is shown in FIG. 4. As seen in this figure, there are forty-two slots 241 formed in the stator core 237. Slots 241 extend parallel to the axis of the core 237 the full width of the core.

In the preferred embodiment, the depth of the slots 241 is slightly more than one half of the radial thickness of the core. The core 237 is approximately 5¼ inches in outside diameter, 13/16 of an inch wide longitudinally and 9/16 of an inch thick radially. The slots 241 are approximately 5/16 of an inch deep, being about 1/16 of an inch wide at the entrance and about ¼ of an inch wide at the inner portion. The forty two portions of the core between the slots 241 are defined as segments 243. Rotor 201 is carried within the stator core 237, with the poles 233 and 235 being approximately 0.03 of an inch from segments 243.

The three stator winding 33–35 each comprise fourteen loops or coils which are located in the slots 241 of the core 237. Each coil or loop of each winding encircles three segments 243 of the core. Electrically insulating inserts (not shown) are located in the slots between their wall structure and their wires to prevent electrical contact between the wires and the core. The stator windings are connected in a Y configuration as shown in FIG. 1 in the dashed block 21 which is an electrical schematic of the alternator.

The alternator as described above is similar to a commercially available alternator manufactured by Delco-Remy, a division of General Motors. The Delco alternator uses 15–20 A.W.G. (American Wire Gage) for its three coil windings which are connected in a Y configuration. Each coil of each winding encircles three segments of the core. Adjacent coils of each winding have totally eight turns located in every third slot of the stator core. For a given winding, each coil at one edge has four turns and at the opposite edge adjacent coils have five and three turns. The Delco alternator produces a maximum of about sixty-three amps of current. References made to Buchsbaum's Complete Handbook of Practical Electronic Reference Data, by William Buchsbaum (Prentice-Hall, Inc. 1978) for conversion from A.W.G. to inches.

The alternators used in the system of FIG. 1 have a unique coil winding configuration for each of their three coil windings which results in the production of voltage and current that will meet all of the requirements of an ambulance at high engine rpm and at low engine idle rpm. This unique coil winding configuration is shown in FIGS. 3 and 4. Thirteen A.W.G. (American Wire Gage) copper wire is used to form the windings which are connected together in a Y configuration.

Referring to FIGS. 3 and 4, the unique coil winding configuration will be described. The coil winding in these figures is for one phase and it is identified as winding 34 of alternator 21. The coil winding configuration for the other two phases, coil windings 33 and 35 is the same as that of coil winding 34. As seen in FIG. 3, the outer edge 34-1A of coil 34-1 has three turns of wire. The outer edge 34-14B of coil 34-14 has two turns of wire. The total turns formed between adjacent coils from adjacent coils 34-1 and 34-2 to adjacent coils 34-13 and 34-14 are as follows: 5, 5, 5, 5, 5, 5, 5, 5, 5, 5, 5, 5, 5. The turns of the left hand edges of coils 34-1 to 34-14 as seen in FIG. 3 are as follows: 2, 3, 2, 3, 2, 3, 2, 3, 2, 3, 2, 3, 2, 2. The turns of the right hand edges of coils 34-1 to 34-14 as seen in FIG. 3 are as follows: 3, 2, 3, 2, 3, 2, 3, 2, 3, 2, 3, 2, 3, 2.

In the stator core of FIG. 4, edges 34-1A and 34-14B of the coil winding 34 are located in slot 241-1. Starting with slot 241-1 and going counterclockwise, it can be seen that every third slot has the following number of turns of windings 34 located therein: 5, 5, 5, 5, 5, 5, 5, 5, 5, 5, 5, 5, 5.

In FIG. 4, only the edge of the coil winding 34 having the turns 2, 3, 2, 3, 2, 3, 2, 3, 2, 3, 2, 3, 2, 2 is shown. In FIG. 3, core segments 243-1, 243-2, and 243-3 encircled by coil 34-1 and core segments 243-4, 243-5 and 243-6 encircled by coil 34-2 are depicted by dotted lines. In FIG. 3, the relative distance between the segments is not shown to scale.

Each of the coil windings 33 and 35 is the same as coil winding 34. The turns of adjacent coils of windings 33 will be located in every third slot starting with slot 241-42 and going counterclockwise. The outer edges of the outer coils of winding 33 will be located in slot 241-42. Thus starting with slot 243-42 and going counterclockwise, every third slot will have the following number of turns of winding 33 located therein: 5, 5, 5, 5, 5, 5, 5, 5, 5, 5, 5, 5, 5, 5. With the turns of the coils so located in every third slot, each coil or loop of winding 33 will encircle three segments 243. The turns of adjacent coils of winding 35 will be located in every third slot starting with slot 241-2 and going counterclockwise. The outer edges of the outer coils of winding 35 will be located in slot 241-2. Thus starting with slot 241-2 and going counterclockwise, every third slot will have the following number of turns from winding 35 located therein: 5, 5, 5, 5, 5, 5, 5, 5, 5, 5, 5, 5, 5, 5. With the turns of coil 35 so located in every third slot, each coil or loop of winding 35 will encircle three segments 243.

An alternator as described above and having the three winding configurations as described in connection with FIGS. 3 and 4, connected in a Y and formed of thirteen A.W.G. copper wire will produce a high output at both high and low engine rpm. Tests have shown the alternator to produce the following output in amps at the given engine rpm. This was for a 3 to 1 ratio where the alternator rotor was turning three times as fast as the engine. 57 amps at 800 rpm; 64 amps at 850 rpm; 72 amps at 1000 rpm; 87 amps at 1250 rpm; 95 amps at 1500 rpm; 98 amps at 1700 rpm; 100 amps at 1800 rpm; 102 amps at 2000 rpm; 104 amps at 2200 rpm; and 107 amps at 2900 rpm. In a dual configuration, the alternators adequately provide enough current at low engine idle to operate the equipment of an ambulance. In other types of vehicles such as taxis or school buses the alternator may be used in a single configuration.

I claim:

1. An alternator of the type having an annular stationary stator with a rotor concentrically located therein, comprising:

an annular structure formed of ferro-magnetic material defining an annular stator core having forty-two segments with adjacent segments being separated by a slot such that there are forty-two slots which extend in a direction parallel to the axis of said stator core, and a three phase stator winding connected in a Y configuration, each phase comprising a winding having fourteen coils extending around said stator core on the inside thereof, each of said coils of each phase winding comprising a plurality of turns of wire encircling three segments, said fourteen coils of each phase winding having a plurality of turns located in fourteen of said slots such that said fourteen slots for each phase winding respectively has the following number of turns located therein, 5, 5, 5, 5, 5, 5, 5, 5, 5, 5, 5, 5, 5, 5, said fourteen coils of each phase winding respectively having the following number of turns at one edge of said winding located outside of said slots on one side of said core, 2, 2, 3, 2, 3, 2, 3, 2, 3, 2, 3, 2, 3, 2, said fourteen coils of each phase winding respectively having the following number of turns at the other edge of said winding located outside of said slots on the other side of said core, 2, 3, 2, 3, 2, 3, 2, 3, 2, 3, 2, 3, 2, 3.

2. The alternator of claim 1, wherein:

each of said windings are formed of 13 A.W.G. electrically conductive wire.

3. The alternator of claims 1 or 2 wherein said alternator is for use on a motor vehicle.

4. An alternator of the type having an annular stationary stator with a rotor concentrically located therein, comprising:

an annular structure formed of ferro-magnetic material defining an annular stator core having forty-two segments with adjacent segments being separated by a slot such that there are forty-two slots which extend in a direction parallel to the axis of said stator core, and a three phase stator winding connected in a Y configuration, each phase winding comprising a winding having fourteen coils extending around said stator core on the inside thereof, each of said coils of each phase winding comprising a plurality of turns of wire encircling three segments, said fourteen coils of each phase winding having a plurality of turns located in fourteen of said slots such that said fourteen slots for each phase winding respectively has the following number of turns located therein, 5, 5, 5, 5, 5, 5, 5, 5, 5, 5, 5, 5, 5, 5.

5. The alternator of claim 4, wherein:

each of said windings are formed of 13 A.W.G. electrically conductive wire.

* * * * *